United States Patent
Vemulapalli et al.

(10) Patent No.: US 8,850,035 B1
(45) Date of Patent: Sep. 30, 2014

(54) GEOGRAPHICALLY DISTRIBUTED REAL TIME COMMUNICATIONS PLATFORM

(75) Inventors: Rajanikanth Vemulapalli, San Jose, CA (US); Linlong Jiang, Sunnyvale, CA (US); Manish Godara, Fremont, CA (US); Gopalakrishnan Krishnan, San Jose, CA (US); Naveen Sanjeeva, Milpitas, CA (US)

(73) Assignee: Yahoo! Inc., Sunnyvale, CA (US)

(*) Notice: Subject to any disclaimer, the term of this patent is extended or adjusted under 35 U.S.C. 154(b) by 1127 days.

(21) Appl. No.: 11/804,232

(22) Filed: May 16, 2007

(51) Int. Cl.
*H04W 24/00* (2009.01)

(52) U.S. Cl.
USPC ............ 709/228; 709/227; 709/229; 709/232; 455/456.5; 455/456.6; 455/404.2

(58) Field of Classification Search
USPC ............ 709/227, 228, 229, 217; 705/28, 401; 455/412.2, 456.1
See application file for complete search history.

(56) References Cited

U.S. PATENT DOCUMENTS

| | | | | |
|---|---|---|---|---|
| 7,206,805 B1 | * | 4/2007 | McLaughlin, Jr. | 709/203 |
| 2002/0004390 A1 | * | 1/2002 | Cutaia et al. | 455/424 |
| 2002/0042818 A1 | * | 4/2002 | Helmer et al. | 709/217 |
| 2005/0027818 A1 | * | 2/2005 | Friedman et al. | 709/217 |
| 2005/0108381 A1 | * | 5/2005 | Hunt et al. | 709/223 |
| 2007/0030824 A1 | * | 2/2007 | Ribaudo et al. | 370/328 |
| 2008/0134274 A1 | * | 6/2008 | Derrenberger et al. | 725/131 |
| 2008/0159134 A1 | * | 7/2008 | Pritchett et al. | 370/230 |

OTHER PUBLICATIONS http://www.visi.com/services/colocation/ "Colocation Services"—Sep. 2006 VISI.*
"Telecommunication Act 2001: Schedule 3 Investigation into Amending The Co-Location Service on Cellular Mobile Telephone Transmission Sites"—New Zealand Commerce Commison, Patterson et al Mar. 2007.*

* cited by examiner

*Primary Examiner* — Randy Scott
(74) *Attorney, Agent, or Firm* — Weaver Austin Villeneuve & Sampson LLP (57) ABSTRACT

A system, comprising a plurality of geographically distributed colocation facilities (colos), each colo comprising a plurality of computing devices configured to establish local connections between the colo and user devices associated with a corresponding set of users; maintain local connection state information relating to the local connections; maintain remote connection state information relating to remote connections between other ones of the colos and user devices associated with the corresponding sets of users; and facilitate sessions between any of the user devices connected to any of the colos with reference to the local and remote connection state information.

20 Claims, 9 Drawing Sheets

GEOGRAPHICALLY DISTRIBUTED REAL TIME COMMUNICATIONS PLATFORM

BACKGROUND OF THE INVENTION

1. Field of the Invention

The present invention relates to facilitating connections and/or sessions between any of the user devices and/or users in a system having multiple colocation facilities, wherein such connections and/or sessions may be facilitated between user devices and/or users associated with different colocation facilities.

2. Background of the Invention

A colocation facility or center (colo) is a type of data center or server farm where a great number of servers and/or databases are relatively closely located, such as within a building or a warehouse. The servers and/or databases are interconnected and together operate to provide multiple types of telecommunications and/or network services.

The types of services provided by colos include, but are not limited to, web commerce, enterprise, and telecommunications services. Among these, Yahoo!® Messenger is a specific example of an application that utilizes a colo infrastructure.

Currently, a single colo architecture often serves as the infrastructure for a particular type of service. For example, with Yahoo!® Messenger, a single colo located in the United States serves all Messenger users throughout the entire world.

A single-colo architecture has several problems. For example, a single-colo architecture has poor scalability. Expansion of services may be limited by colo capacity, which is limited by the particular physical plant in which the colo is located. Users far away from the colo's geographical location may experience poor quality services. For example, if a colo is located in the United States, then international users in Europe, Asia, Africa, and Australia may experience delays in their connections to the colo due to the long distances separating the users and the colo. If the single colo experiences difficulties or problems, there are typically no other colos stepping in to provide services. On the other hand, if a failover backup colo is provided to take over the services when the primary colo experiences problems, then the backup colo remains idle for the majority of times when the primary colo functions correctly. In addition, it is often difficult to keep an idle backup colo up to date with the latest software application and/or hardware capacity due to the lack of real traffic. And a single-colo lacks the ability for customization based on local needs and requirements.

Accordingly, what is needed are systems and methods to address the above-identified problems.

SUMMARY OF THE INVENTION

Broadly speaking, the present invention relates to facilitating connections and/or sessions between any of the user devices and/or users within a system having multiple colocation facilities, wherein such connections and/or sessions may be facilitated between user devices and/or users associated with different colocation facilities. In one embodiment, a system comprising a plurality of geographically distributed colocation facilities (colos) is described. Each colo in the system comprises a plurality of computing devices configured to establish local connections between the colo and user devices associated with a corresponding set of users; maintain local connection state information relating to the local connections; maintain remote connection state information relating to remote connections between other ones of the colos and user devices associated with the corresponding sets of users; and facilitate sessions between any of the user devices connected to any of the colos with reference to the local and remote connection state information.

In another embodiment, a colocation facility (colo) configured to operate in a system comprising a plurality of geographically distributed colos is described. The colo comprises a plurality of computing devices configured to establish local connections between the colo and user devices associated with a corresponding set of users; maintain local connection state information relating to the local connections; maintain remote connection state information relating to remote connections between other ones of the colos and user devices associated with the corresponding sets of users; and facilitate sessions between any of the user devices connected to any of the colos with reference to the local and remote connection state information.

In another embodiment, a computer-implemented method is described. The method comprises establishing local connections between the colo and user devices associated with a corresponding set of users; maintaining local connection state information relating to the local connections; maintaining remote connection state information relating to remote connections between other ones of the colos and user devices associated with the corresponding sets of users; and facilitating sessions between any of the user devices connected to any of the colos with reference to the local and remote connection state information.

In another embodiment, a computer program product is described. The computer program product comprises a computer-readable medium having a plurality of computer program instructions stored therein, which are operable to cause at least one computing device to establish local connections between the colo and user devices associated with a corresponding set of users; maintain local connection state information relating to the local connections; maintain remote connection state information relating to remote connections between other ones of the colos and user devices associated with the corresponding sets of users; and facilitate sessions between any of the user devices connected to any of the colos with reference to the local and remote connection state information.

These and other features, aspects, and advantages of the invention will be described in more detail below in the detailed description and in conjunction with the following figures.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. In addition, while the invention will be described in conjunction with the particular embodiments, it will be understood that it is not intended to limit the invention to the described embodiments. To the contrary, it is intended to cover alternatives, modifications, and equivalents as may be included within the spirit and scope of the invention as defined by the appended claims.

As discussed above, a colocation facility or center (colo) is a type of data center or server farm where a great number of servers and/or databases are relatively closely located, such as within a building. Generally, the servers at the same colo are interconnected with fast and reliable connections. With a system that contains multiple colos, the various colos may be geographically distributed throughout the world, with each colo providing services to users located relatively close to that colo. For example, a multi-colo system may have a colo in the United States serving users in North America, another colo in Brazil serving users in South America, a third colo in France serving users in Western Europe, a fourth colo in China serving users in Eastern Asia, and so on. The same functionalities are replicated at each colo so that regardless of the colo to which a user is connected, the user receives the same services as users connected to any other colos in the multi-colo system. In fact, the actual connections are transparent to the users, such that a user is not aware of the colo to which he or she is connected.

In one embodiment, if one colo experiences problems, users connected to that colo may be redirected to other functioning colos so that services to the users will not be interrupted. Again, this adjustment may be transparent to the users.

A user connects to a particular colo via his or her user device, such as a personal computer, a personal digital assistant (PDA) device, cellular phones, MP3 players, televisions, other wireless devices, SIP (Session Initiation Protocol) phones, Internet phones, online gaming devices, etc. For example, a Yahoo. Messenger user may connect to the Messenger service at his or her computer via the Internet by executing the Messenger application and providing a login and password. By establishing a connection to the Messenger service, the user, in effect, has established a connection to a particular colo that provides the Messenger service.

Figure 1A:
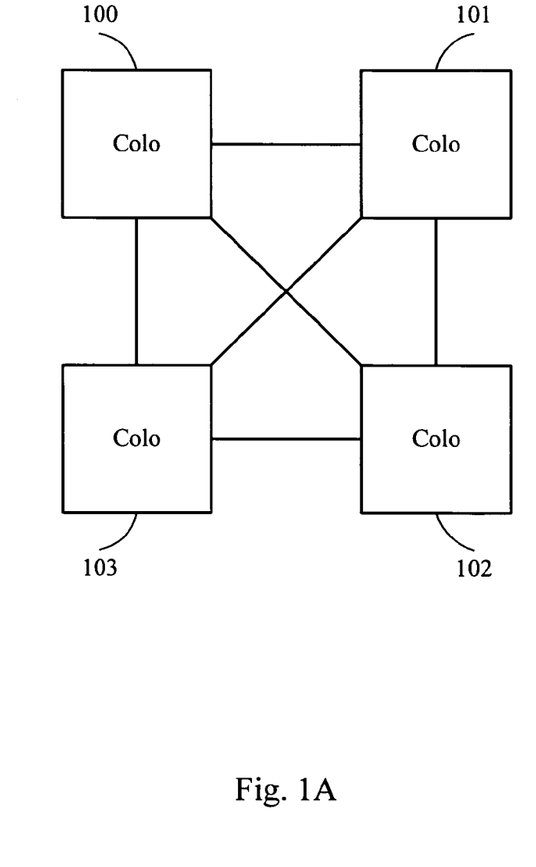
FIGS. 1A-1D illustrate four variations of multi-colo architectures.

There are different ways to manage a multi-colo system and enable the colos within the system to communicate with each other such that a service may be provided or an application may be run which previously was enabled by a single colo architecture. FIGS. 1A-1D illustrate four examples of variations of a multi-colo architecture. FIG. 1A illustrates a broadcast model. Each colo 100, 101, 102, 103 in the system is communicatively connected to every other colo in the system. Every communication from every colo 100, 101, 102, 103 is broadcasted to all other colos. For example, if colo 101 needs to send a message, colo 101 will send the same message to colo 100, colo 102, and colo 103, regardless of the colo to which the recipient of the message is actually connected. This model results in many redundant and thus wasted communications.

Figure 1B:
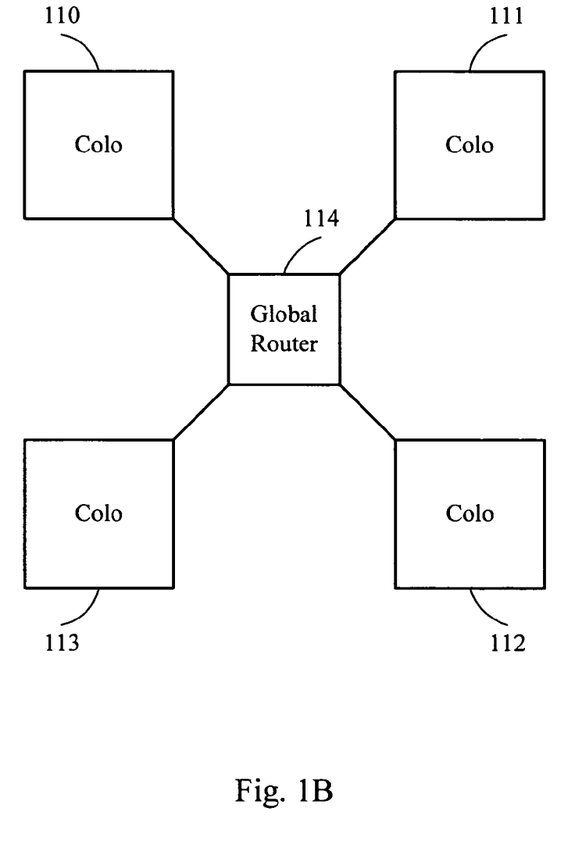

FIG. 1B illustrates a global router model. According to this model, all the colos 110, 111, 112, 113 are communicatively connected to a global router 114. Communications from each colo 110, 111, 112, 113 intended for other colos are sent to the global router 114 first. The global router 114 determines the correct destination colo for each communication and forwards the communication to the appropriate colo. In this model, the global router 114 becomes a bottleneck for the system. In addition, if the global router 114 experiences difficulties, the entire system may be affected because of this single point of failure.

Figure 1C:
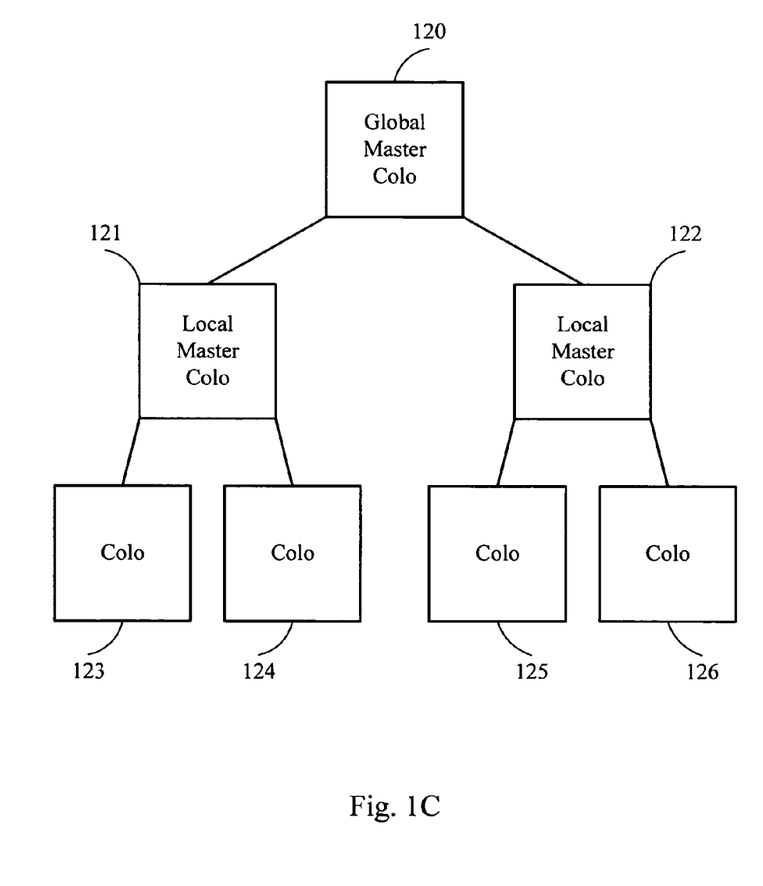

FIG. 1C illustrates a hierarchical model. This model is a combination of the broadcast and global router models. At the top level, a global master colo 120 manages the entire system. Below the global master colo 120 are local master colos 121, 122. These local master colos 121, 122 manage subsets of the colos within their respective regions. In FIG. 1C, local master colo 121 manages colo 123 and colo 124, while local master colo 122 manages colo 125 and colo 126. Again, the global master colo 120 may become a bottleneck for the system, and is a single point failure for the entire system. In addition, the local master colos 121, 122 are bottlenecks for the colos under their management.

Figure 1D:
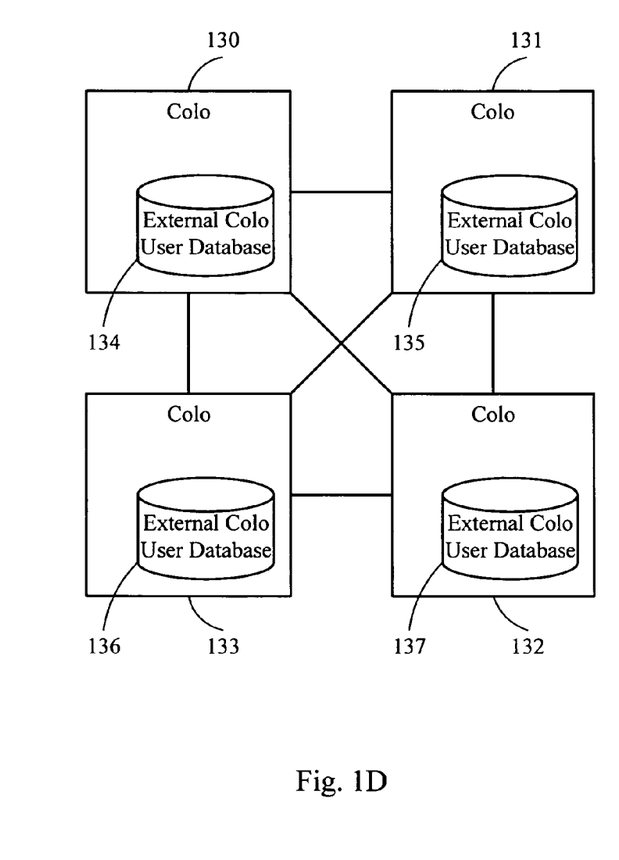

FIG. 1D illustrates a forking model. This model is similar to the broadcast model shown in FIG. 1A. In this model, each colo 130, 131, 132, 133 is again communicatively connected with every other colo in the system. Each colo 130, 131, 132, 133 contains an external colo user database 134, 135, 136, 137, which contains information relating to the colo to which a user is connected. When a colo needs to send a message to a particular user (the recipient), the message is first sent to the colo to which the sender colo's database indicates that the recipient is connected. If the recipient is no longer connected to that colo, then the message is broadcast to all the colos in the system. This model may also result in redundant and wasted communications.

To address the problems in the architecture models shown in FIGS. 1A-1D, FIG. 2 is a block diagram illustrating an example of a multi-colo system constructed in accordance with an interoperability/federation model. The multi-colo system shown has four individual colos 200, 210, 220, 230. However, there is no limit to the number of colos that may be included in the system. According to a specific embodiment, colos 200, 210, 220, 230 are geographically distributed and each colo is self-contained.

Figure 2:
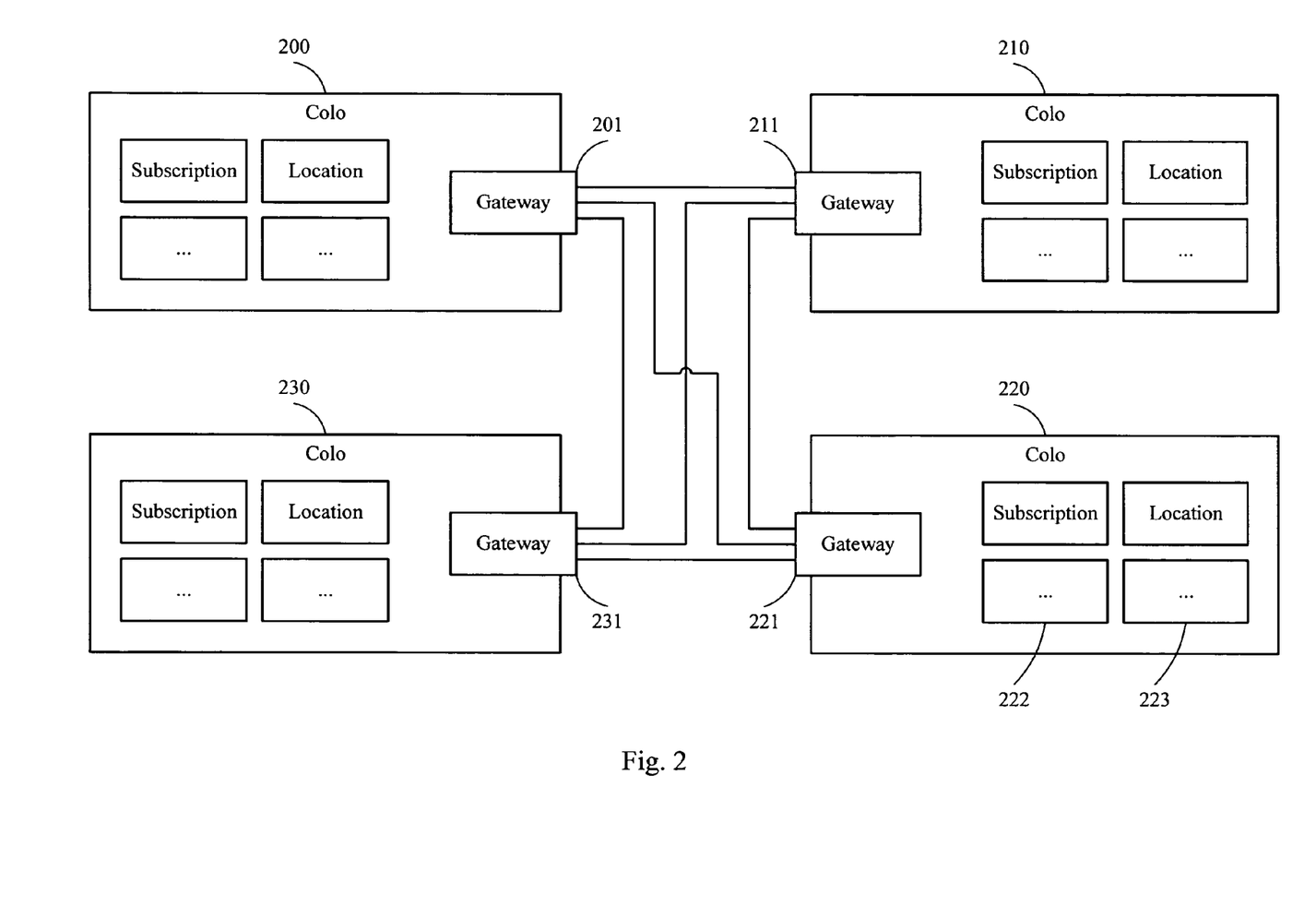
FIG. 2 is a block diagram illustrating an example of a multi-colo system.

In one embodiment, certain standard components are included in each colo 200, 210, 220, 230. For example, each colo 200, 210, 220, 230 comprises a gateway service 201, 211, 221, 231. The colos 200, 210, 220, 230 are communicatively connected to each other via their respective gateway services 201, 211, 221, 231. In one embodiment, the colos 200, 210, 220, 230 both send and receive communications via the gateway services 201, 211, 221, 231. In another embodiment, the colos 200, 210, 220, 230 only receive communications via the gateway services 201, 211, 221, 231, while other components in a colo may directly send communications to other colos' gateway services 201, 211, 221, 231.

Communications among the colos 200, 210, 220, 230 may be achieved using various types of methods, depending on the specific implementations of the system, as long as all colos agree on the communication protocols used. For example, a standard Internet protocol, such as TCP/IP (Transmission Control Protocol/Internet Protocol), may be used. Alternatively, a proprietary protocol may be specified.

In addition to these standard components duplicated at all colos 200, 210, 220, 230, each colo may have its own customized components that perform functionalities particular to that colo. For example, colo 220 may have two customized components 222, 223. These customized components are not duplicated at other colos and are designed to serve the particular needs and requirements of a particular colo. The customized components may perform functionalities specific or unique to the individual colos. For example, authentication scheme may be different for each colo. One colo may use one type of authentication scheme, and a second colo may choose a different type of authentication scheme, while a third colo may choose not to perform any authentication at all. In the case of Yahoo!® Messenger, when a user logs into a colo, he or she may receive a greeting message in his or her own language or news updates that are specifically tailored based on his or her geographical location (country and/or region).

Moreover, depending on the particular requirements of the application, the multi-colo system may be Business Continuity Planning (BCP) compliant. With business or financial companies and institutions, a BCP consists of many internal as well as external components. Generally, an effective BCP coordinates across these components, identifies potential problems such as process or system dependencies, and mitigates risks.

Figure 3:
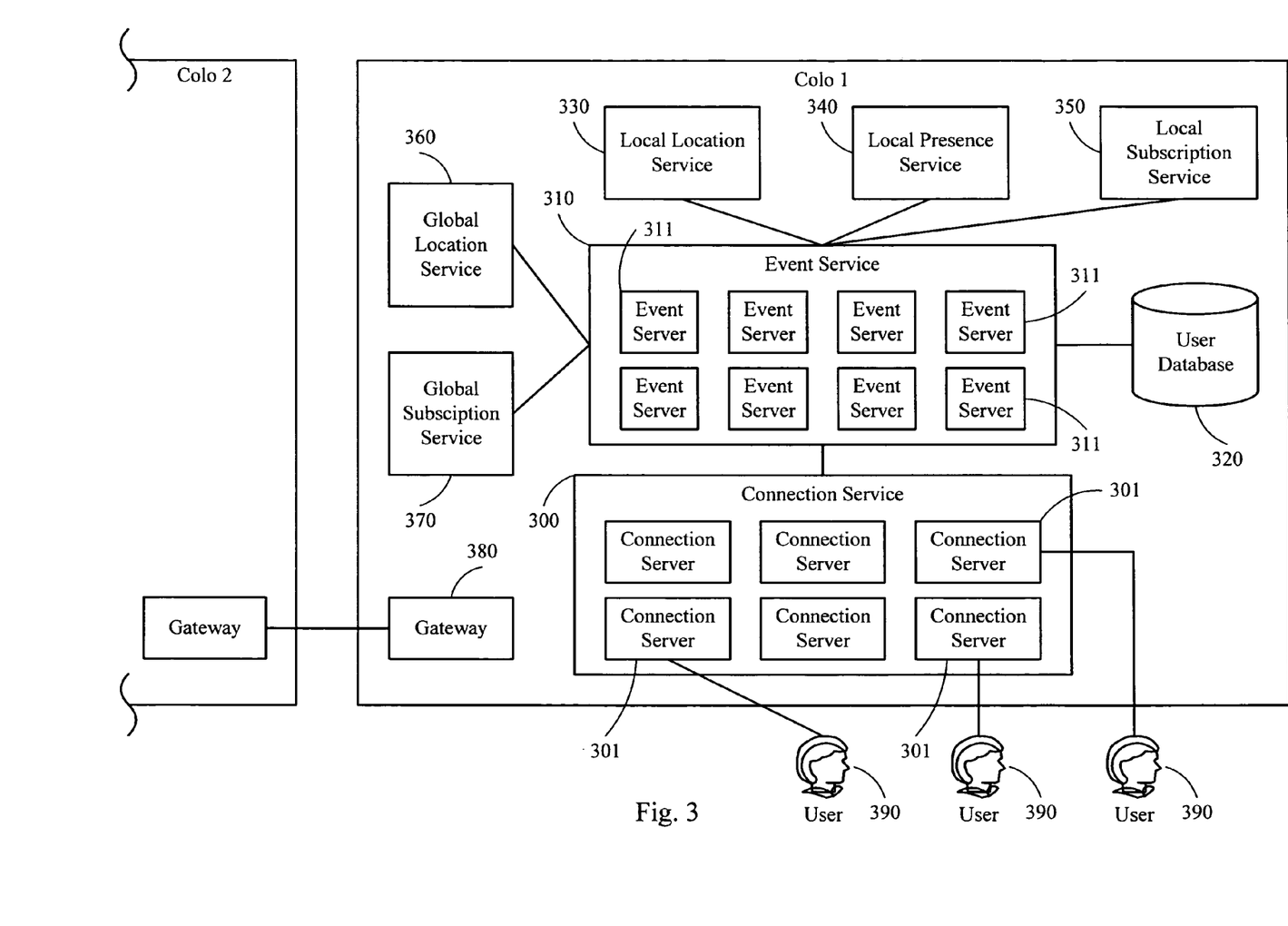
FIG. 3 is a block diagram illustrating a particular colo within the multi-colo system shown in FIG. 2 in more detail.

To further describe the standard components and their functionalities at a specific colo, FIG. 3 is a block diagram illustrating a particular colo within the multi-colo system shown in FIG. 2 in more detail. As explained above, the standard components are duplicated at each colo in the system and perform the same functionalities for the colos, so that regardless of the colo to which a user is connected, the user will receive the same services.

In one embodiment, a connection service 300 enables users 390 to connect to the colo, and in turn to the system. The connection service 300 may include a group of connection servers 301. When a user 390 establishes a connection to the colo, the user 390 may be connected to any one of the connection servers 301. In one embodiment, a load-balancing scheme may be used to determine to which connection server 301 a newly connected user 390 is actually connected, so that each connection server 301 serves approximately the same number of users 390. The users 390 usually are not aware of the connection servers 301 to which they are connected, or even to which colo they are connected. From a user's point of view, once he or she establishes a connection, he or she is simply connected to the system.

Users 390 may connect to the colo via various types of user devices. The word "connection," as used here, denotes a user device's connection to a particular colo. For example, a first user may establish a connection to the system via his or her personal computer while another user may establish a connection via his or her personal digital assistant (PDA) device, such as a BlackBerry®. In one embodiment, once a user 390 establishes a connection to the colo via his or her user device, the user 390 maintains the same connection until the user 390 disconnects. In other words, each user 390 is associated with a particular colo while the user 390 remains connected to the system. However, it is not always necessary for a user's connection to a particular colo to be persistent throughout a login session. In another embodiment, the user may connect to different colos within one login session.

From a colo's point of view, users 390 directly connected to the colo may be considered local to that colo, and are therefore referred to herein as local users. Users connected to other colos in the system may be considered remote to that colo, and are therefore referred to herein as remote users.

Users connected to the system may communicate with each other via their respective user devices, regardless of whether the users are connected to the same colo or different colos. Any two users connected to the system may establish a communication session. Thus, the word "session," as used here, denotes communication or data transfer between any two user devices and the associated users. Examples of sessions between user devices and the associated users include, but not limited to, text messaging sessions, text conferencing sessions, voice messaging sessions, voice conferencing sessions, video messaging sessions, video conferencing sessions, file sharing sessions, online gaming sessions, or social networking sessions, etc.

In one embodiment, an event service 310 processes all events initiated by the local users 390 connected to the colo. In one example, a user needs to be authenticated before he or she is able to connect to the system. The user may provide a login and a password to the connection service 300, which forwards the login and password to the event service 310. The event service 310 verifies the user's login and password against a user database 320. The user database 320 contains all registered users in the entire system along with their respective logins and passwords. One example of such a user database 320 may be a Lightweight Directory Access Protocol (LDAP) directory. Another example of the user database 320 may simply be a table with every user's login and password stored in pairs. The event service 310 determines whether the login and password provided by the user match the appropriate record in the user database 320 in order to either accept (in the event the login and password are correct) or refuse (in the event the login and password are incorrect) the connection.

However, it is not necessary that a user must be authenticated before he or she can establish a connection to the colo. The system may be an open system that allows any person to connect to it. In this case, no authentication is necessary, and consequently, the user database 320 will not be needed. Nevertheless, the user ID may need to be validated even if no user authentication is required.

Regardless of whether users are required to be authenticated or not, each user in the system may be identified by a unique identification (ID). The ID is unique throughout the entire system so that regardless of the colo to which a user is connected, he or she may be identified by his or her ID.

In another example, a user 390, the sender, connected to the connection service 300 sends a message to another user, the recipient, in the system. The sender may specify the recipient by the recipient's unique ID. The connection service 300 forwards the message to the event service 310. The event service 310 first determines whether the recipient is a local user (also connected to the same colo as the sender) or a remote user (connected to a different colo) by first querying the local location service 330 (described below in more detail). If the recipient is a local user, then in one embodiment, the event service 310 may also receive the recipient's local location information from the local location service 330 in the same query. The event service 310 then sends the message back to the connection service 300 along with the recipient's location information so that the connection service 300 may forward the message to the recipient.

On the other hand, if the recipient is a remote user, then the event service 310 queries the global location service 360 (described below in more detail) to determine the colo to which the recipient is connected. The event service 310 then sends the message to the gateway service 380 (described below in more detail), and the gateway service 380 sends the message to the appropriate colo where the recipient is connected. As an optimization, the connection server 301 may send the message to another connection server 301 at the recipient's colo directly, bypassing all other services including the gateway service 380, if the connection server 301 has the necessary information about the recipient's colo and location information. This typically happens when the sender's colo has recently sent messages to the recipient's colo and the recipient's colo has replied with its colo and location information. In this case, the connection server 301 needs to maintain all the necessary communication information for the destination recipient itself.

FIGS. 4-7 below describe some of the user events processed by the event service 310 in more detail and further illustrate the interactions between the various components in the colo in response to these events.

As will be understood, the event service 310 may be implemented with a group of event servers 311 processing multiple user events concurrently. Again, a load-balancing scheme may be used to determine which event server 311 handles which event, so that each event server 311 processes approximately the same number of events.

In one embodiment, a local location service 330 maintains location information for all the local users connected to the colo. Location information for a user may include the connection server 301 and the port of the connection server 301 to which the user is connected. There are different ways to store the location information for the local users 390. For example, the local location service 330 may maintain a table for all the local users. The following is a sample representation of such a table:

TABLE 1

Local Location Information

| Local User Identification (ID) | Connection Server (CS) ID | Port Number |
|---|---|---|
| User 1 | CS 10 | Port 3 |
| User 2 | CS 2 | Port 6 |
| ... | ... | ... |
| User n | CS 1 | Port 55 |

In Table 1, User 1, User 2 . . . User n are local users connected to this colo, Colo 1. User 1 is connected to the colo via connection server 10 at port 3; User 2 is connected to the colo via connection server 2 at port 6; and so on.

Thus, when a query is made, for example, by the event service 310, to the local location service 330 to determine whether a particular user is local or remote, the local location service 330 may search through its table to determine whether the user in question is included in the table. If the user in question is not included in the table, then that user is either a remote user (connected to another colo) or offline.

On the other hand, if the user in question is included in the table, then that user is a local user (connected to this colo), and the local location service 330 may determine the location of that user in terms of the connection server 311 and the port of the connection server 311 to which the user in question is connected. In the above scenario where a user sends a message to another user, the local location service 330 may send the location information (connection server ID and port number) for the recipient user to the event service 310 when the recipient user is a local user. The event service 310 in turn forwards this information to the connection service 300, and the connection service 300 may determine where to deliver the message based on the recipient user's connection server ID and port number.

Thus, in this embodiment, the local and global location services only contain records of those users who are currently online. To determine whether a user is local, remote, or offline, a query may first be made to the colo's local location service. If the user is found in the local location service, then the user is local (connected to this colo). If the user is not found in the local location service, then the user may either be remote or offline. Next, a query may be made to the global location service. If the user is found in the global location service, then the user is remote (connected to another colo). A determination may then be made as to which remote colo the user is connected. On the other hand, if the user is not found in the global location service too, then the user is offline.

In one embodiment, a local presence service 340 maintains the presence information for all the local users connected to the colo. The presence information of a user indicates the current status or state of that user. For example, a user may be available, busy, idle, in a meeting, or away from the user device temporarily. Table 1 described above for the users' location information may also be used to store the users' presence information, by incorporating an additional column for the presence information. The following is a sample representation of such a table:

TABLE 2

Local Location and Presence Information

| Local User ID | Connection Server (CS) ID | Port Number | Presence Information |
|---|---|---|---|
| User 1 | CS 10 | Port 3 | Available |
| User 2 | CS 2 | Port 6 | Idle |
| ... | ... | ... | ... |
| User n | CS 1 | Port 55 | Busy |

In Table 2, again, User 1, User 2 . . . User n are local users connected to this colo, Colo 1. User 1 is connected to the colo via connection server 10 at port 3 and is currently online and available; User 2 is connected to the colo via connection server 2 at port 6 and is currently idle; and so on.

Although the local location service 330 and the local presence service 340 are two separate components, from an implementation point of view, the two components may be implemented together. That is, a single software routine or block of code may be used to determine both the user's local and presence information, just as a single table may be used to store both local users' local and presence information. By searching through the table, a local user's location and presence information may be determined at the same time.

In one embodiment, a local subscription service 350 maintains subscription information for the local subscriber users 390. The subscription service enables the users to subscribe to information about other users in the system. For example, user 1 may subscribe to information about user 2. In this case, user 1 is the subscriber and user 2 is the subscribee. If user 2 changes his or her status, user 1 will be notified. The local subscription service 350 maintains a list of subscription information for the local subscribers. The following is a sample representation of such a list:

TABLE 3

Local Subscription Information

| Subscribee User ID | Local Subscriber User ID |
|---|---|
| User 1 | User 3, User 5, User 10, User 54, User 105 |
| User 2 | User 14, User 65 |
| ... | ... |
| User n | User 6, User 21, User 88 |
| User A | User 3, User 4, User 7, User 44 |
| User B | User 1 |
| ... | ... |
| User N | User 6, User 31, User 54 |

The list shown in Table 3 is indexed by the subscribees. Table 3 potentially includes all subscribees in the entire system as long as there are subscribers in that colo interested in their presence. For each subscribee, a list of his or her subscribers is associated with the subscribee, and only the local subscribers (subscribers connected to this colo) are listed. Thus, User 1 is subscribed by User 3, User 5, User 10, User 54, and User 105; User A is subscribed by User 3, User 4, User 7, and User 44; and so on. By looking at this list, the colo may determine which local users subscribe to a particular user. When that subscribee changes his or her presence information or goes offline/online, all the local subscribers may be notified.

Although the list in Table 3 is indexed by the subscribees, in another embodiment, it is also possible to index the table by the subscribers, in which case for each entry (row) of the table, all the users to which a subscriber subscribes are associated with that subscriber.

In one embodiment, a global location service 360 maintains location information for all the users, both local and remote, in the system. The location information indicates the colo to which each user is connected. There are different ways to store the location information for the remote users. For example, a lookup table may be used. The following is a sample representation of such a table:

TABLE 4

Global Location Information

| User ID | Colo ID |
|---|---|
| User 1 | Colo 1 |
| User 2 | Colo 1 |
| ... | Colo 1 |
| User n | Colo 1 |
| User A | Colo 5 |
| User B | Colo 2 |
| ... | ... |
| User N | Colo 7 |

In Table 4, User 1, User 2 . . . User n are local users connected to this colo, Colo 1, and User A, User B . . . User N are remote users connected to other colos in the system. For example, User A connects to Colo 5; User B connects to Colo 2; and so on. When a query is made to the global location service 360 to determine which colo a particular remote user is connected to, the global location service 360 may check the table to determine the necessary information.

The same global location list is duplicated at each colo in the system and is maintained by the global location service 360 of each colo. This enables every colo to be able to determine exactly which user is connected to which colo. Consequently, when a colo needs to send a message to a remote user, the colo knows exactly the remote colo to which the message should be sent.

In one embodiment, a global subscription service 370 maintains subscription information for all the subscriber users who subscribe to information about all the subscribee users. This service 370 is similar to the local subscription service 350, except that the subscribers include both local and remote users and are identified by their respective colos. If a subscribee changes his or her status, by querying this global subscription service 370 the colo may determine which colos need to be notified of the change so that the remote colos may in turn notify the subscribers connected to those colos. The global subscription service 370 may maintain a list of the global subscription information, and the following is a sample representation of such a list:

TABLE 5

Global Subscription Information

| Subscribee User ID | Colo ID For subscribers |
|---|---|
| User 1 | Colo 1, Colo 6 |
| User 2 | Colo 2, Colo 8, Colo 10, Colo 11 |
| ... | ... |
| User n | Colo 4, Colo 6, Colo 9 |
| User A | Colo 2, Colo 3 |
| User B | Colo 5, Colo 10, Colo 11 |
| ... | ... |
| User N | Colo 3, Colo 6, Colo 7 |

The list shown in Table 5 is indexed by the subscribees, and the subscribees may connect to local or remote colo, or may even be offline. Thus, Table 5 again includes all subscribees of the entire system. For each subscribee user, the list indicates which colos have users subscribing to that subscribee's information and need to be notified in case the user changes his or her status. Thus, for User 1, there are subscriber users connected to Colo 1 and Colo 6 who subscribe to User 1's information. There may be multiple users connected to Colo 1 or Colo 6 all subscribing to User 1's information. Similarly, for User A, there are subscriber users connected to Colo 2 and Colo 3 who subscribe to User A's information.

The global subscription list is duplicated at each colo and maintained by the global subscription service 370 of each colo. This enables every colo to be able to determine exactly where to send a notification when a subscribee user has changed his or her status. Assume User 2 has changed his status. User 2 is connected to Colo 1 and is subscribed by users connected to Colo 2, Colo 8, Colo 10, and Colo 11. Thus, Colo 1 sends a notification to each of Colo 2, Colo 8, Colo 10, and Colo 11. Colo 2, upon receiving the notification, may determine from its own local subscription service which local subscriber users subscribe to User 2 and forward the notification to those local subscribers of Colo 2. The same procedure also takes place at Colo 8, Colo 10, and Colo 11.

Although the local subscription service 350 and the global subscription service 370 are two separate components, from an implementation point of view, the two components may be implemented together. A single software routine of a block of code may send notification to both local subscribers as well as other colos. In the data structure that represents the subscription list, a flag may be used to indicate whether a subscriber is a local subscriber user ID or a colo ID. In other words, Table 3 and Table 5 above may be combined into a single list. The software may then treat each subscriber appropriately.

In addition, a gateway service 380 handles communications between the colos. The gateway service 380 may be communicatively connected to the gateway services of the other colos in the system. As described above, in one embodiment, the gateway service 380 both sends and receives communications between the colos. In this case, if the other components in the colo, such as the event service 310, need to send messages to anther colo, the messages are first sent to the local gateway service 380 along with the destination colo's ID, and the gateway service 380 forwards the messages to the gateway service of the recipient colo. Similarly, messages from the other colos are first received at the gateway service 380, and the gateway service 380 forwards the messages to the other components in the colo, such as the event service 310.

In another embodiment, the gateway service 380 may only receive communications, while the other components, such as the event service 310, directly send messages to the gateway service 380 in the other colos, bypassing its own gateway service 380. In one embodiment, the system may be statically configured so that for any given colo ID, the event service 310 is able to reach the gateway service 380 at that colo.

Additional components may be included at each colo as needed to provide customized functionalities for the specific colo.

Having described the standard components at a colo individually, next, how the colo responds to various types of user events are described in order to further illustrate the interactions between these components.

Figure 4:
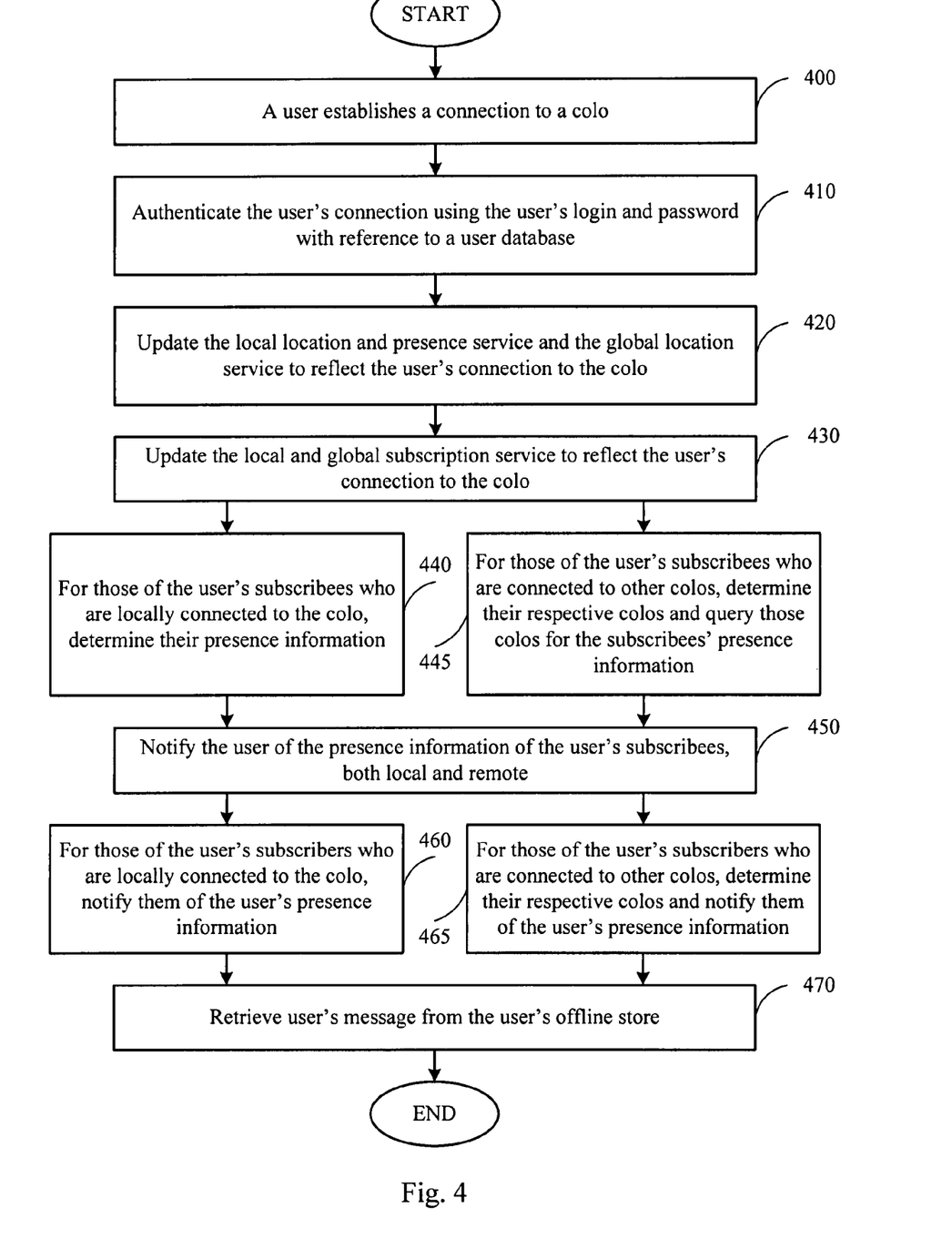
FIG. 4 is a flowchart of a method for a user to connect to a particular colo within a multi-colo system.

FIG. 4 is a flowchart of a method for a user to connect to a particular colo within a multi-colo system. At 400, a user, for example user 1, is attempting to establish a connection to a colo, for example colo 1, via colo 1's connection service. If the system requires its users to be authenticated, then user 1 may be required to provide a unique login and a password. On the other hand, if the system does not require user authentication, then user 1 may only need to provide a unique login. The login may be used as the user's ID to identify each user in the system.

If the system requires the users to be authenticated, then at 410, user 1 is authenticated using the login and password provided by user 1. The connection service forwards user 1's login and password to the event service. The event service queries the user database with reference to user 1's login and password. If the login and password provided by user 1 match the record of that user in the user database, then the authentication is successful. The event service may notify the connection service, and the connection service will keep the connection between user 1 and the connection server. If the authentication fails, then the connection service may destroy the connection with user 1 until user 1 provides a valid login and password.

Once a user has successfully established a connection with the colo, the user is considered a local user to that colo. At 420, the colo's local location and presence service as well as the global location service are notified of user 1's connection to colo 1, and each service respectively updates the information maintained by that service. For the local location service, an entry is created and added to the local location list for user 1, indicating the connection server and port number to which user 1 is connected. For the local presence service, an entry is created and added to the presence information table for user 1, indicating user 1's current status, such as online, busy, away, etc.

For the global location service, an entry is created and added to the global location table for user 1, indicating that user 1 is connected to colo 1. Alternatively, if the global location table already contains an entry for user 1, then that entry is updated to indicate that user 1 is connected to colo 1. In one embodiment, a message may be sent to the other colos in the system, notifying all the other colos of user 1's connection to colo 1. All the other colos will then update their respective global location table to add the entry for user 1, indicating that user 1 is connected to colo 1. This ensures that the global location tables at all the colos are synchronized.

At 430, the local and global subscription services are notified, and each service respectively updates the information maintained by that service. Assume user 1 subscribes to four other users: user 2 also connected to colo 1, user A connected to colo 5, user B connected to colo 6, and user C is offline. For the local subscription service, user 1 needs to be added to the subscriber list of user 2, and if there is no entry for user 2 in the local subscription list yet, an entry needs to be created for user 2, having user 1 as user 2's subscriber, and added to the local subscription list. The same applies to user A, B, and C.

For the global subscription service, colo 1 needs to be added to the colo list of user 2, user A, user B, and user C because now user 2, user A, user B, and user C each has a user, user 1, connected to colo 1 subscribing to their information. If there is no entry yet for user A in the global subscription list, an entry needs to be created for user A, having colo 1 on user A's list. The same applies to user 2, user B, and user C. In one embodiment, a message may be sent to the other colos in the system, notifying the colos of user 1's subscription information. All the other colos will then update their respective global subscription list to add colo 1 to user 2, user A, user B, and user C's entries. This ensures that the global subscription lists at all the colos are synchronized.

At 440, for those users to whom user 1 subscribes and who are local to colo 1, presence information is determined by querying the local presence service. In the above example, user 1 subscribes to one local user, user 2. Thus, user 2's presence information should be maintained by the local presence service of colo 1. A query to the local presence service of colo 1 may determine user 2's current status, such as online, busy, etc.

At 445, for those users to whom user 1 subscribes and who are connected to the other colos, a query request is sent to the appropriate colos to obtain their presence information. In the above example, user 1 subscribes to user A and user B, both of whom are connected to other colos. A request is sent to colo 5 to obtain user A's presence information, and another request is sent to colo 6 to obtain user B's presence information. The requests may be sent via its own gateway service or directly to the remote gateway services at the other colos. User C is determined to be offline because it is not in either local or global location service.

At 450, the presence information of the subscribee users, user 2, user A, and user B, once determined, is forwarded to user 1 via the connection service. At this point, user 1 should be aware of the current status of users 2, A, and B, to whom user 1 subscribes.

A similar notification is sent to those users who subscribe to the presence information about user 1. At 460, for those users subscribing to user 1's information who are locally connected to colo 1, a notification is sent to each local subscriber user about user 1's current status. This may be achieved by parsing through the local subscription list to locate the entry for user 1 to determine which local users subscribe to user 1's information. If there is no entry for user 1 in the local subscription list, then no local user subscribes to user 1's information.

Recall that when user 1 first logs in, user 1 is added to each of his subscribees' lists. Similarly, when user 1's subscriber first logs in, user 1's subscriber is added to user 1's list. Thus, the local subscription list already contains information on which local users, if any, subscribe to user 1's information.

At 465, for those users subscribing to user 1's information who are remotely connected to other colos, a notification is sent to the appropriate colos to notify these colos of user 1's current status. Each remote colo, upon receiving the information, may determine which local users subscribe to user 1's information via its own local subscription service and in turn notify these local subscribers.

Optionally, user 1 is notified of any messages, such as via email or voice mail, sent to user 1 while user 1 is offline. Also optionally, at 470, messages sent to user 1 while user 1 is offline are retrieved from user 1's offline store. The offline store may be globally accessible and provides storage for storing messages sent to the users while these users are offline. The next time a user connects to any colo, those messages received while the user is offline are retrieved from the storage and forwarded to the user. At this point, a user has completed his or her login process.

Figure 5:
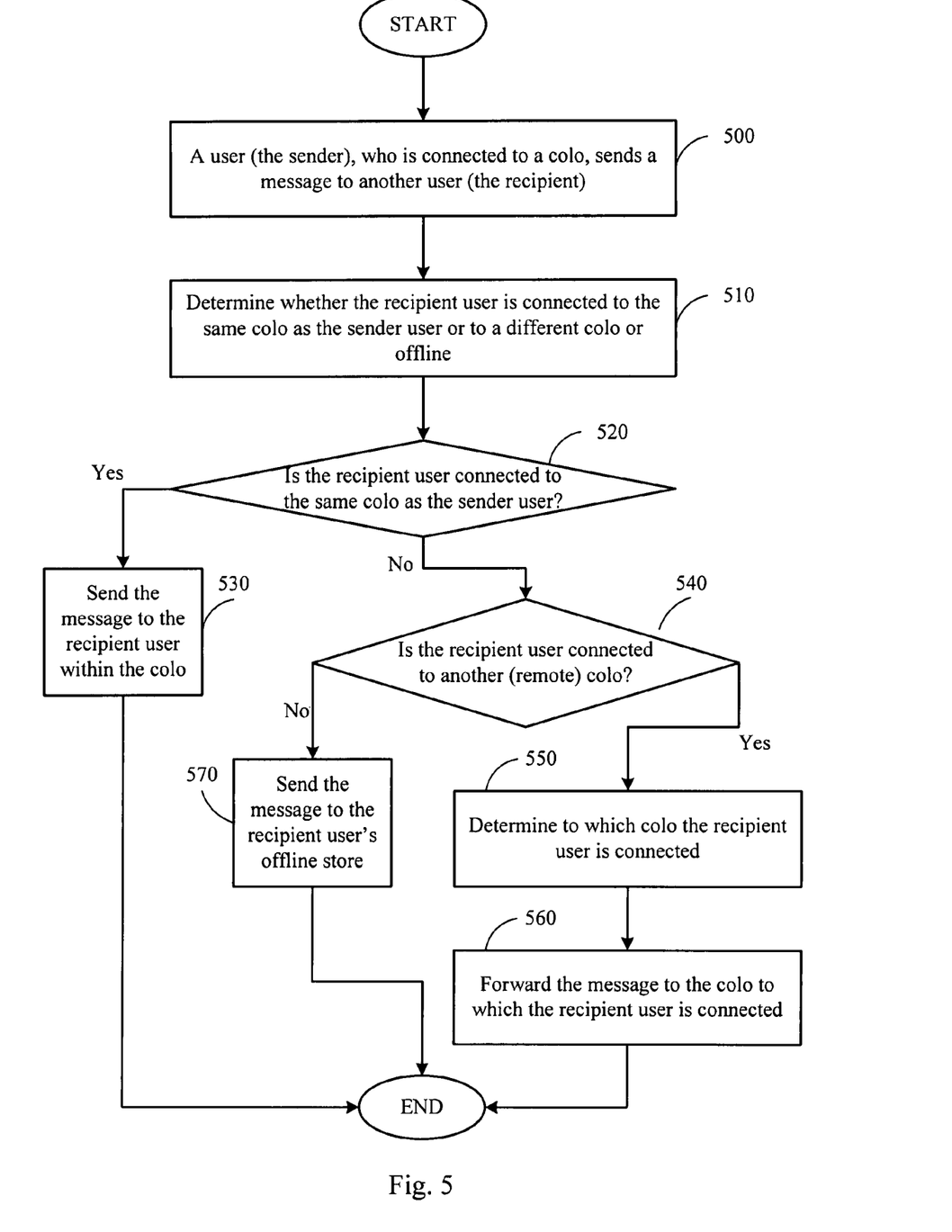
FIG. 5 is a flowchart of a method for a user who is connected to a particular colo within a multi-colo system to send a message to another user within the multi-colo system.

FIG. 5 is a flowchart of a method for a user who is connected to a particular colo within a multi-colo system to send a message to another user within the multi-colo system. At 500, a sender user, who is connected to a particular colo, sends a message to a recipient user. The recipient user may also be connected to the same colo as the sender user, in which case the sender and recipient are both local to the colo. Alternatively, the recipient user may be connected to another colo different from the colo to which the sender user is connected, in which case the recipient user is a remote user with reference to the colo to which the sender user is connected.

At 510, the colo determines whether the recipient user is connected to the local colo or to another remote colo or offline. This determination may be made by first querying the local location service, since the local location service maintains a list of all the local users. If the recipient is on the local location list, then the recipient is local. In this case, the recipient's connection server and port number may also be determined from the local location service. Otherwise, the recipient is remote or offline.

At 520, if the recipient user is connected to the same colo as the sender user, then at 530, the message is sent to the recipient user by the connection service at the appropriate connection service and port number. On the other hand, if the recipient user is not connected to the same colo as the sender user (i.e., the recipient is not on the local location list), then the recipient user may either be remote or offline.

At 540, the colo determines whether the recipient user is connected to another remote colo or offline. This may be done by querying the global location service. If the global location service indicates that the recipient user is online (connected to a different/remote colo), then at 550, the colo determines to which remote colo the recipient user is connected. This may be done by again querying the global location service to determine the colo ID associated with the recipient user. At 560, the message is forwarded to the appropriate colo for the recipient user via the gateway service or directly to the appropriate service at the other colo. Otherwise, the recipient user is offline. At 570 the message is stored at the recipient user's offline storage until the next time the recipient user logs in to the system.

Figure 6:
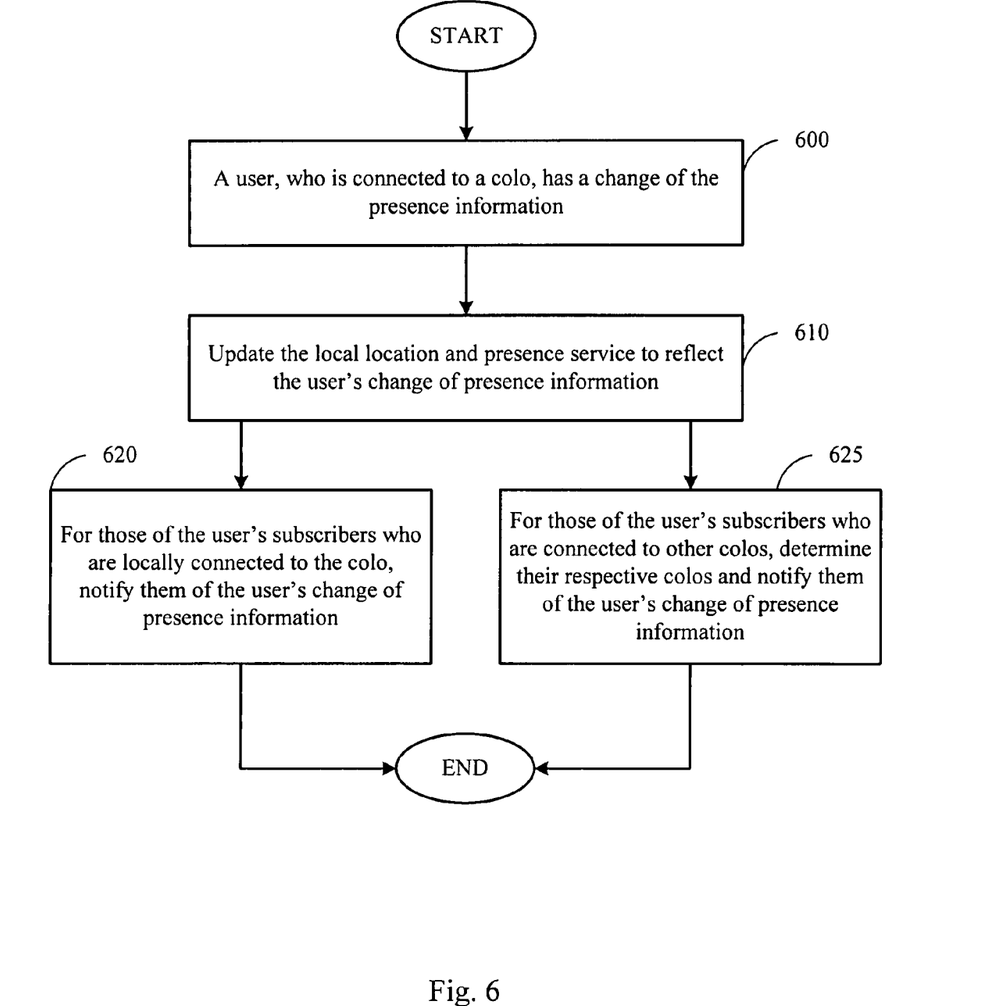
FIG. 6 is a flowchart of a method for a user who is connected to a particular colo within a multi-colo system to change the user's presence information.

As will be understood, 510, 520, 530, 540, 550, 560, and 570 may be implemented as a software program. The following is a sample of pseudo code that may reflect one specific implementation of the software program:

"local_location_presence" is an array of m data structures, indicating the location and presence information for the local users; each data structure contains the following fields: user_ID, connection_server_ID, connection_port_number, and status; alternatively, this variable may also be implemented as a linked list of the same data structures or other types of data;

"global_location" is an array of n data structures, indicating the location information for all the users in the system; each data structure contains the following fields: user_ID, and colo_ID; alternatively, this variable may also be implemented as a linked list of the same data structures or other types of data;

"sender ID" is the sender user's ID;

"recipient_ID" is the recipient user's ID;

"message" is the message that sender sends to the recipient;

for (i==0; i<m; i++) { // determine whether recipient is local
  if (local_location_presence[i].user_ID==recipient_ID) {
    // recipient is local
    forward message to recipient based on
      local_location_presence[i].connection_server_ID
      and
      local_location_presence[i].connection_port_number;
    exit; // done, message is sent
  }
} // recipient is not found on the local list, may be remote or offline for (i==0; i<n; i++) { // determine the colo recipient is connected to
  if (global_location[i].user_ID==recipient_ID) {
    forward message to global_location[i].colo_ID;
    exit; // done, message is sent
  }
} // recipient is not found on global list, must be offline
forward message to recipient's offline storage FIG. 6 is a flowchart of a method for a user who is connected to a particular colo within a multi-colo system to change the user's presence information. At 600, a user, user 1, who is connected to a colo, for example colo 1, has changed his status. For example, the user may have logged out, in which case the status of the user is changed to offline, or the user may be away or busy.

At 610, the local presence service is notified to reflect the change of user 1's status. The entry for user 1 in the local presence information table maintained by the local presence service is updated to reflect the current status of the user.

At 620, for those local users who subscribe to user 1's presence information, a notification is sent to each of the local subscriber users, notifying them of user 1's change of status. This may be done by querying the local subscription list for the entry for user 1 to determine which local users subscribe to user 1's presence information. A notification is then sent to each local subscriber user on the list for user 1 via the connection service. Recall that the local subscription list is indexed by the subscribees. If there is no entry for user 1 on the local subscription list, then no local users subscribe to user 1's information.

At 625, for those remote users who subscribe to user 1's presence information, a notification is sent to each of the appropriate colos to notify the remote subscribers of user 1's change of status. To determine which colo has users subscribing to user 1's presence information, a query may be made to the global subscription service. Recall that the global subscription list is also indexed by the subscribees. The entry for user 1 in the global subscription list should indicate all the colos that have users subscribing to user 1's presence information. A notification may then be sent to each of these colos, and each colo in turn may notify its own local users who subscribe to user 1's information of user 1's status change by querying its own local subscription list. If there is no entry for user 1 on the global subscription list, then no users in the system subscribe to user 1's information.

Figure 7:
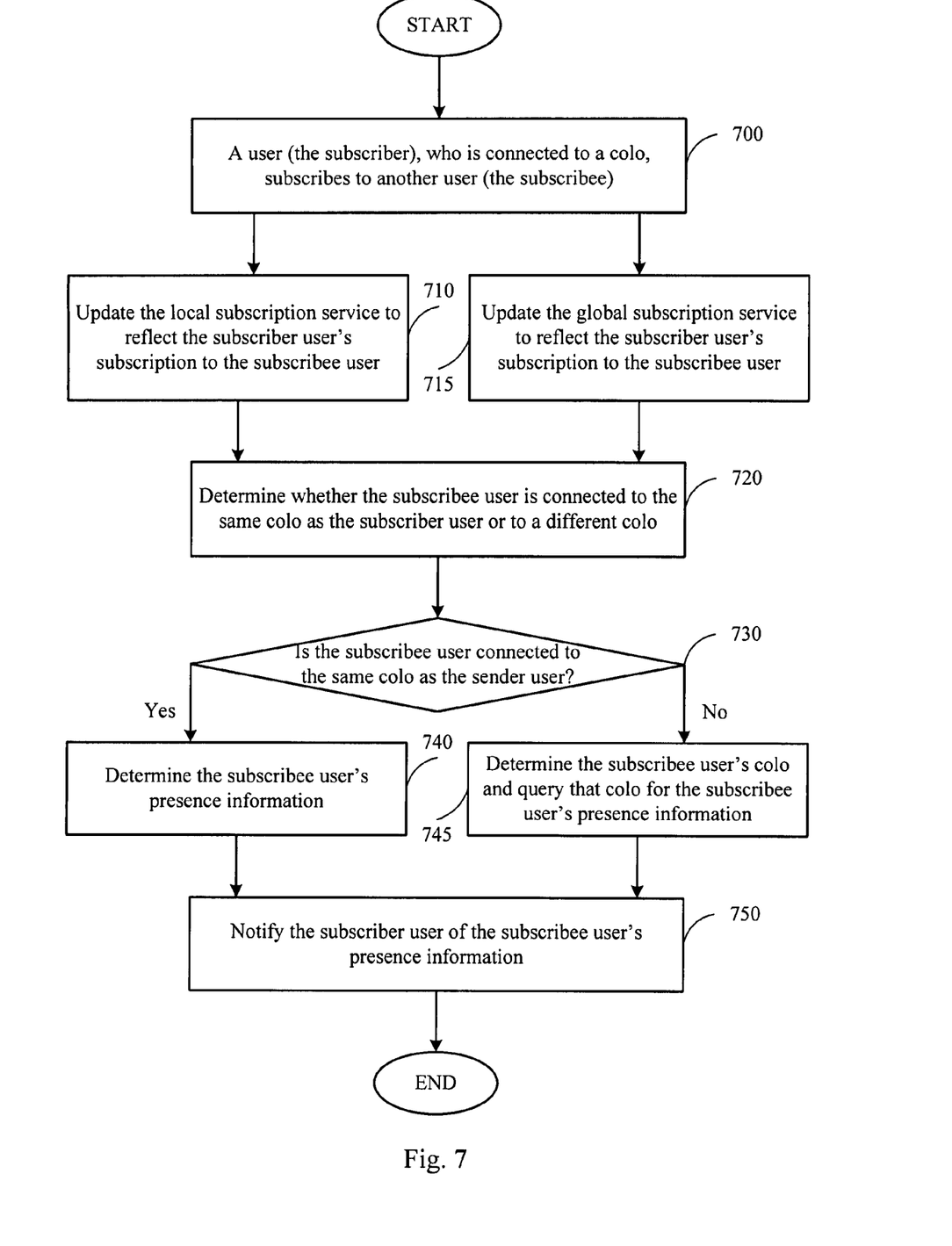
FIG. 7 is a flowchart of a method for a user who is connected to a particular colo within a multi-colo system to subscribe to another user within the multi-colo system.

FIG. 7 is a flowchart of a method for a user who is connected to a particular colo within a multi-colo system to subscribe to another user within the multi-colo system. At 700, a subscriber user, who is connected to a colo, for example colo 1, subscribes to the presence information of another user, the subscribee user.

At 710, the local subscription service is notified to update the local subscription list to reflect this new subscription made by the subscriber user, because the subscriber user is locally connected. The subscriber user is added to the subscribee user's entry. If no entry for the subscribee user exists on the local subscription list, a new entry is created and added to the local subscription list for the subscribee user.

At 715, the global subscription service is notified to update the global subscription list to reflect this new subscription made by the subscriber user. Colo 1 is added to the subscribee user's entry, because the subscriber user is connected to colo 1. If no entry for the subscribee user exists on the global subscription list, a new entry is created and added to the global subscription list for the subscribee user. In one embodiment, a notification may be sent to all other colos in the system, notifying the other colos that the subscribee user now has a user connected to colo 1 subscribing to his information, so that the other colos may also update their respective global subscription lists accordingly, to add the subscriber user's colo ID, colo 1, to the entry of the subscribee user.

At 720, the colo, colo 1, determines whether the subscriber user is connected to the same colo as the subscriber user. Again, this may be done by querying colo 1's local location service to determine if the subscribee user is on the local location list, as described above in FIG. 5.

At 730, if the subscribee user is locally connected to colo 1, then at 740, the subscribee user's presence information is determined. This may be done by querying colo 1's local presence service to determine the subscribee user's current status, as described above in FIG. 5.

If the subscribee user is connected to another colo, then at 745, a query is sent to the subscribee user's colo to request subscribee user's presence information. This may be done by first querying colo 1's global location service to determine the colo to which the subscribee user is connected, and then sending a request to that colo via the gateway service, as described above in FIG. 5. The response from that colo also goes through the gateway service first.

Once the presence information of the subscribee user is determined, at 750, a notification is sent to the subscriber user via the connection service, indicating the presence information of the subscribee user. The connection information for the subscriber user may be determined from the local connection service.

Figure 8:
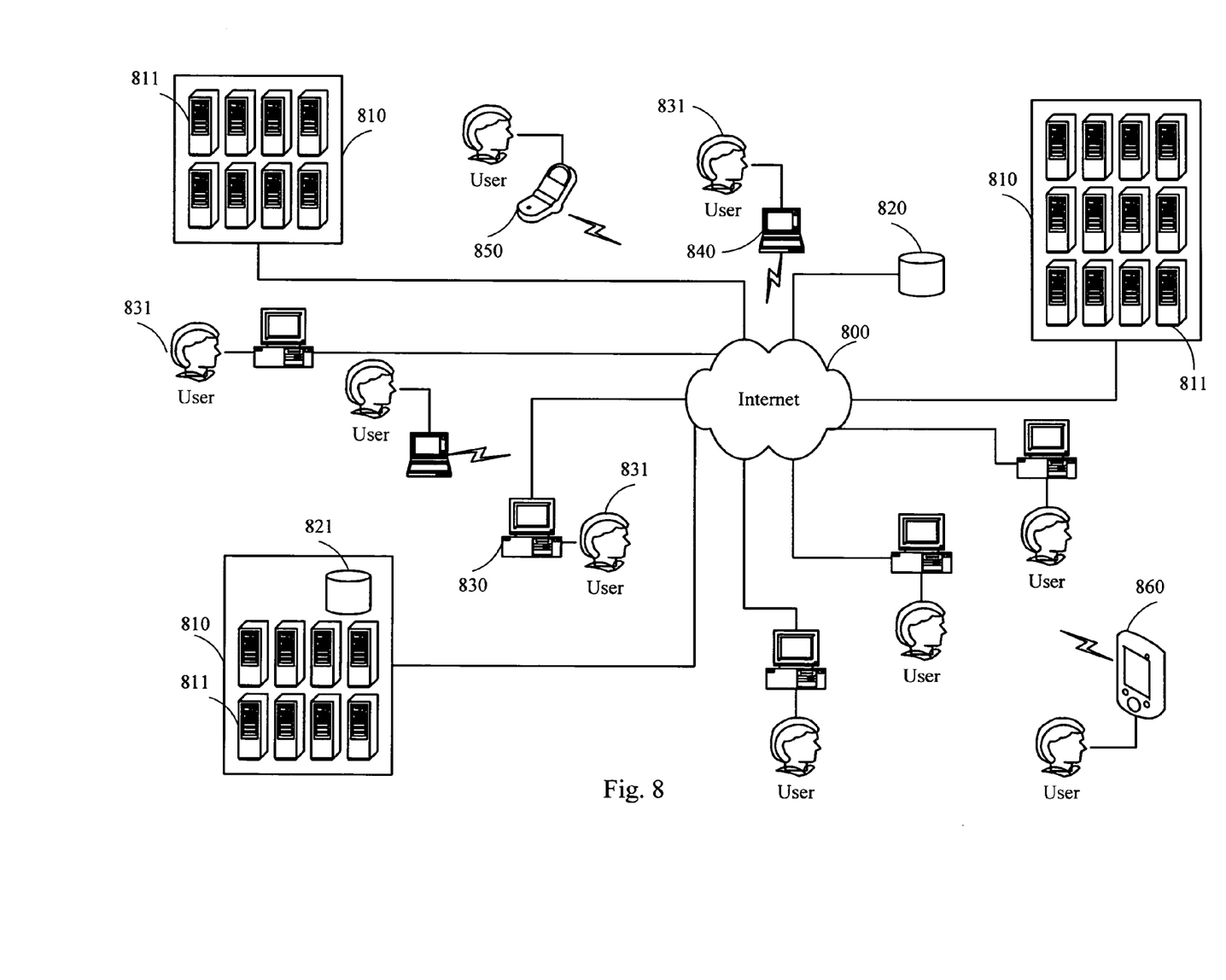
FIG. 8 is a simplified diagram of a network environment in which specific embodiments of the present invention may be implemented.

The methods described above in FIGS. 4-7 may be carried out in programmed computing systems having a wide variety of configurations. FIG. 8 is a simplified diagram of an example of a network environment in which specific embodiments of the present invention may be implemented. The various aspects of the invention may be practiced in a wide variety of network environments (represented by network 800) including, for example, TCP/IP-based networks, telecommunications networks, wireless networks, etc. The colos 810 are connected to the network 800. Communications among the colos 810 may be sent via the network 800.

According to various embodiments, a colo may include many computing devices, e.g., servers 811. Some colos may also include one or more databases 821. Alternatively, one or more databases 820 may be located elsewhere in the network 800 in which case the colos access data stored in such databases 820 via the network 800. The databases 820, 821 may be used to store user information as well as local and global location, presence, and subscription lists.

Users 831 may connect to a respective one of the colos 810 via the network using different methods and devices such as, for example, computers 830, wireless devices 840, mobile telephones 850, PDAs 860, etc. There are different methods to determine to which colo a user device should be connected. For example, a user may be connected to the colo located closest to the user geographically. Alternatively, all users running a particular type of application or connecting with a particular type of device may be connected to the same colo.

The software program(s) implementing various embodiments may be executed on the servers 810. For example, the connection service, event service, local location, presence, and subscription service, global location and subscription service may be implemented as one or more software programs executing on the servers 810.

In addition, the computer program instructions with which embodiments of the invention are implemented may be stored in any type of computer-readable media, and may be executed according to a variety of computing models including, for example, on a stand-alone computing device, or according to a distributed computing model in which various of the functionalities described herein may be effected or employed at different locations.

A multi-colo system designed according to embodiments of the present invention has potentially several advantages over a single-colo system. For example, a multi-colo system may result in significant savings in hardware. Assume an example system which needs to serve eight million concurrent users. A single-colo architecture, including a primary colo and a failsafe backup colo, might require approximately one thousand servers (i.e., five hundred servers for the primary colo and five hundred servers for the backup colo). By contrast, a multi-colo architecture having three individual colos designed according to the invention might only require approximately seven hundred and fifty servers (i.e., two hundred and fifty servers at each colo). The active colos themselves act as each other's failsafe backup. This provides a savings of approximately two hundred and fifty servers. As the number of concurrent users increases, more servers may be saved.

While this invention has been described in terms of several preferred embodiments, there are alterations, permutations, and various substitute equivalents, which fall within the scope of this invention. It should also be noted that there are many alternative ways of implementing the methods and apparatuses of the present invention. It is therefore intended that the following appended claims be interpreted as including all such alterations, permutations, and various substitute equivalents as fall within the true spirit and scope of the present invention.

What is claimed is:

1. A system, comprising:
    a plurality of geographically distributed colocation facilities (colos), each colo comprising a plurality of computing devices, including a plurality of connection servers, that are closely located with each other, one or more replicated services being replicated on each colo, and the one or more replicated services of each colo configured to
        establish a local connection between each local user's user device and a specific one of the plurality of connection servers of the colo;

maintain local connection state information identifying each local user and the specific one of the plurality of connection servers of the colo to which the local user's user device is connected;

maintain remote connection state information relating to each remote connection between a remote user's user device and a specific one of the plurality of connection servers of another one of the plurality of colos, wherein the remote connection state information relating to a remote connection identifies the remote user and the remote user's colo;

facilitate user device to user device sessions between any of the user devices connected to any of the plurality of colos with reference to the local and remote connection state information, whereby each one of the plurality of colos is configured to use such colo's local connection state information for communication relating to each local user and each one of the plurality of colos is configured to use such colo's remote connection state information to forward communications related to each remote user to another one of the plurality of colos of such remote user so that such remote user receives the forwarded communications;

maintain presence information relating to the local users whose user device has a local connection with said each colo and the remote users whose user device has a local connection with another one of the colos, wherein the presence information comprises a plurality of connected states with respect to which colo each local or remote user is connected; and publish the presence information relating to at least one of the remote users whose user device has a local connection with another one of the colos to each local user whose user device has a local connection with said each colo, according to subscription information for the at least one remote user and each local user, and such subscription information being associated with said each colo.

2. The system, as recited in claim 1, wherein each colo is further configured to provide indicators to selected ones of the local and remote users, wherein the indicators represent connection state information relating to at least one user device-connected to a connection server of another one of the colos.

3. The system, as recited in claim 1, wherein each colo is further configured to store a message sent from a local user to a remote or local user whose presence information indicates that such remote or local user is unavailable.

4. The system, as recited in claim 1, wherein each colo is further configured to authenticate each of the local users with reference to a user database when establishing the local connections.

5. The system, as recited in claim 1, wherein the sessions comprise one or more of text messaging sessions, text conferencing sessions, voice messaging sessions, voice conferencing sessions, video messaging sessions, video conferencing sessions, file sharing sessions, online gaming sessions, or social networking sessions.

6. The system, as recited in claim 1, wherein the user devices comprise one or more of computers, personal digital assistants, cellular phones, MP3 players, or televisions.

7. A colocation facility (colo) configured to operate in a system comprising a plurality of geographically distributed colos that include one or more replicated services, comprising:

a plurality of computing devices, including a plurality of connection servers, that are closely located with each other and configured to implement the one or more replicated services so as to:

establish a local connection between each local user's user device and a specific one of the connection servers;

maintain local connection state information identifying each local user and the specific connection server to which such local user's user device is connected;

maintain remote connection state information relating to each remote connection between a remote user's user device and a specific connection server of another one of the colos, wherein the remote connection state information identifies each remote user and such remote user's colo;

facilitate user device to user device sessions between any of the user devices connected to any of the colos with reference to the local and remote connection state information, whereby each colo is configured to use such colo's local connection state information for communication relating to each local user and each colo is configured to use such colo's remote connection state information to forward communications related to each remote user to another colo of such remote user so that such remote user receives the forwarded communications;

maintain presence information relating to the local users whose user device has a local connection with said each colo and the remote users whose user device has a local connection with another one of the colos, wherein the presence information comprises a plurality of connected states; and publish the presence information relating to at least one of the remote users whose user device has a local connection with another one of the colos to each local user whose user device has a local connection with said each colo, according to subscription information for the at least one remote user and each local user, and such subscription information being associated with said each colo.

8. The colo, as recited in claim 7, wherein the computing devices are further configured to provide indicators to selected ones of the local and remote users, wherein the indicators represent connection state information relating to at least one user device-connected to a connection server of another one of the colos.

9. The colo, as recited in claim 7, wherein the computing devices are further configured to store a message sent from a local user to a remote or local user whose presence information indicates that such remote or local user is unavailable.

10. The colo, as recited in claim 7, wherein the computing devices are further configured to authenticate each of the local users with reference to a user database when establishing the local connections.

11. The colo, as recited in claim 7, wherein the sessions are selected from the group consisting of text messaging sessions, text conferencing sessions, voice messaging sessions, voice conferencing sessions, video messaging sessions, video conferencing sessions, file sharing sessions, online gaming sessions, and social networking sessions.

12. The colo, as recited in claim 7, wherein the user devices are selected from the group consisting of computers and personal digital assistants.

13. A computer-implemented method for use with a colocation facility (colo) configured to operate in a system comprising a plurality of geographically distributed colos that each colo comprises a plurality of computing devices, including a plurality of connection servers, that are closely located with each other, one or more services being replicated on each colo, the method comprising:

establishing a local connection between each local user's user device and a specific one of the connection servers;

maintaining local connection state information identifying each local user and the specific connection server to which such local user's user device is connected;

maintaining remote connection state information relating to each remote connection between a remote user's user device and a specific connection server of another one of the colos, wherein the remote connection state information identifies each remote user and such remote user's colo;

facilitating user device to user device sessions between any of the user devices connected to any of the colos with reference to the local and remote connection state information, whereby each colo is configured to use such colo's local connection state information for communication relating to each local user and each colo is configured to use such colo's remote connection state information to forward communications related to each remote user to another colo of such remote user so that such remote user receives the forwarded communications;

maintaining presence information relating to the local users whose user device has a local connection with said each colo and the remote users whose user device has a local connection with another one of the colos, wherein the presence information comprises a plurality of connected states; and     publishing the presence information relating to at least one of the remote users whose user device has a local connection with another one of the colos to each local user whose user device has a local connection with said each colo, according to subscription information for the at least one remote user and each local user, and such subscription information being associated with said each colo.

14. The computer-implemented method, as recited in claim 13, further comprising:

providing indicators to selected ones of the local and remote users, wherein the indicators represent connection state information relating to at least one user device connected to a connection server of another one of the colos.

15. The computer-implemented method, as recited in claim 13, further comprising:

storing a message sent from a local user to a remote or local user whose presence information indicates that such remote or local user is unavailable.

16. The computer-implemented method, as recited in claim 13, further comprising:

authenticating each of the local users with reference to a user database when establishing the local connections.

17. The computer-implemented method, as recited in claim 13, wherein the sessions are selected from the group consisting of text messaging sessions, text conferencing sessions, voice messaging sessions, voice conferencing sessions, video messaging sessions, video conferencing sessions, file sharing sessions, online gaming sessions, and social networking sessions.

18. The computer-implemented method, as recited in claim 13, wherein the user devices are selected from the group consisting of computers and personal digital assistants.

19. A computer program product for use with a colocation facility (colo) configured to operate in a system comprising a plurality of geographically distributed colos, each colo comprising a plurality of computing devices, including a plurality of connection servers, that are closely located with each other, one or more replicated services being replicated on each colo, the computer program product comprising at least one non-transitory computer-readable medium having a plurality of computer program instructions for implementing the one or more replicated services stored therein, which are operable to cause at least one computing device to:

establish a local connection between each local user's user device and a specific one of the connection servers;

maintain local connection state information identifying each local user and the specific connection server to which such local user's user device is connected;

maintain remote connection state information relating to each remote connection between a remote user's user device and a specific connection server of another one of the colos, wherein the remote connection state information identifies each remote user and such remote user's colo;

facilitate user device to user device sessions between any of the user devices connected to any of the colos with reference to the local and remote connection state information, whereby each colo is configured to use such colo's local connection state information for communication relating to each local user and each colo is configured to use such colo's remote connection state information to forward communications related to each remote user to another colo of such remote user so that such remote user receives the forwarded communications;

maintain presence information relating to the local users whose user device has a local connection with said each colo and the remote users whose user device has a local connection with another one of the colos, wherein the presence information comprises a plurality of connected states; and     publish the presence information relating to at least one of the remote users whose user device has a local connection with another one of the colos to each local user whose user device has a local connection with said each colo, according to subscription information for the at least one remote user and each local user, and such subscription information being associated with said each colo.

20. The computer program product, as recited in claim 19, wherein the sessions comprise one or more of text messaging sessions, text conferencing sessions, voice messaging sessions, voice conferencing sessions, video messaging sessions, video conferencing sessions, file sharing sessions, online gaming sessions, or social networking sessions.

\* \* \* \* \*